United States Patent Office 3,790,649
Patented Feb. 5, 1974

3,790,649
PREPARATION OF ESTERS OF PHOSPHORUS ACIDS
Ignatius Schumacher, 1009 S. Elm 63119, and Joseph W. Baker, 421 Greenleaf Drive 63122, both of St. Louis, Mo.
No Drawing. Filed June 24, 1971, Ser. No. 156,487
Int. Cl. C07f 9/08, 9/16
U.S. Cl. 260—973
17 Claims

ABSTRACT OF THE DISCLOSURE

Halogen-containing esters of phosphorus acids are prepared by an improved process whereby thiol- or hydroxyl-containing organic materials and phosphorus halides are reacted at specified temperatures in the presence of a distillation residue, produced by distilling (a) the product derived from a reaction mixture of a thiol- or hydroxyl-containing organic material, a phosphorus halide and a catalyst material selected from amide, phosphorus amide, urea and ammonium salt compounds containing a nitrogen atom capable of forming a complex with a phosphorus moiety or (b) the product derived from such reaction mixture in which said distillation residue is employed as the catalyst material, thereby providing high yields of substantially pure esters and allowing preparation of selected halogen-containing mono- and di-esters of phosphorus esters having substantially no side reactant contamination. The phosphorus esters are useful as intermediates in the preparation of plasticizers, oil additives and functional fluids.

CROSS REFERENCES TO RELATED APPLICATIONS

Copending applications Ser. Nos. 103,874, 103,831 and 103,877, all filed Jan. 4, 1971 and Ser. No. 104,171, filed Jan. 5, 1971, disclose the preparation of halogen-containing mono- and di-esters of phosphorus acids and aromatic tri-esters of phosphorus acids utilizing amides, phosphorus amides, ureas and ammonium salts as catalysts for the reaction of phosphorus halides with thiol- or hydroxyl-containing organic material.

BACKGROUND OF THE INVENTION

This invention relates to a novel process for the preparation of halogen-containing organophosphorus esters. More particularly, this invention is concerned with a batch or continuous process for reacting halides of phosphorus and thiol- or hydroxyl-containing organic materials in the presence of reaction mixture distillation residues.

In the above-noted related copending applications, the product ester and excess reactants are normally distilled from each reaction mixture and the distillation residue is discarded.

Organophosphorus esters, such as triaryl phosphate esters, have previously been prepared using, as the catalyst, certain metals and metal halides, e.g., copper powder, iron filings, calcium, aluminum, magnesium, aluminum chloride, magnesium chloride, boron trifluoride, copper sulfate, magnesium oxide and copper oxide. The employment of such catalysts has several attendant inherent disadvantages, among which are low conversion and lengthy reaction times. As described in U.S. 2,610,- 978 and U.S. 2,632,018, an insoluble complex is formed during the reaction when aluminum chloride is used as a catalyst. Further, the by-products obtained contribute to lower yields and lower reaction efficiency and difficult distillation problems. A method described in U.S. 2,410,- 118 is illustrative of the typical distillation problems encountered. In that method, distillation is difficult due to the high concentration of salts of various phosphorus acids in the distillation still.

U.S. 3,077,491 describes the use of distillation residues containing the chlorides of aluminum, magnesium and zinc as catalysts for preparing phosphate esters. The problems encountered by using such catalysts are not, however, effectively alleviated merely by using such metal chlorides in admixture with the reaction mixture distillation residue. Moreover, the distillation residues utilized therein contain solid complexes of the metal catalysts with a phenol. Such complexes are difficult to work with, as is recognized by the disclosure that as much as 85 percent of the recycled material is the phosphate product. Such high percentage recycling of product is necessary to keep the solid catalyst complex in suspension in order to facilitate the flow of material and retard the build-up of the solid catalyst complex in pipelines and valves.

A process which affords the use of distillation residue as principal catalyst source and yet does not involve handling solid materials or require the recycling of large amounts of product would be a distinct advantage in the process of the art.

Accordingly, the objective of this invention is to provide a novel and improved process for the preparation of halogen-containing phosphorus esters in which the disadvantages of the prior art are eliminated and selective esterification in high yields with substantially no by-product contamination is afforded.

SUMMARY OF THE INVENTION

In accordance with the present invention, it has been surprisingly found that, although recycling of metal halide distillation still residues does not eliminate the basic faults inherent in the catalysts per se, certain distillation still residues containing liquid amides, phosphoramides, ureas and ammonium salts are useful as catalysts in the preparation of halogen-containing phosphorus esters from phosphorus halides and thiol- or hydroxyl-containing materials.

In accordance with the process of this invention, it has been found that the distillation residue of the reaction mixture produced by reacting a phosphorus halide with a thiol- or hydroxyl-containing organic material in the presence of the aforementioned catalysts is a remarkably efficient catalyst for the reaction and that after initiation of the reaction, only small amounts of fresh catalyst need be added from time to time to perpetuate the reaction at high levels.

The process of this invention comprises reaction, at specific temperatures, of halides of phosphorus of the formula (I)
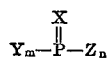

wherein:

X represents oxygen or sulfur;
Y represents R or R'X wherein R represents alkyl, alkenyl, alkynyl, cycloalkyl, cycloalkenyl, cycloalkynyl, heterocyclyl or aryl;
R' represents alkyl or aryl;
$m$ represents 0 when $n=3$ and $m$ represents 1 when $n=2$;
Z represents chloro or bromo; and
$n$ represents 2 or 3 with a compound having the formula (II) 

wherein:

R" represents aryl; and
X represents oxygen or sulfur, in the presence of a distillation residue, produced by distilling (a) the product derived from a reaction mixture of a thiol- or hydroxyl-containing organic material, a phosphorus halide and a catalyst material selected from amide, phosphoramide, urea and ammonium salt compounds containing a nitrogen atom capable of forming a complex with phosphorus or (b) the product derived from such reaction mixture in which said distillation residue is employed as the catalyst material.

The reaction sequence involved in the process of this invention proceeds through the following stages, exemplified by the reaction of phenol with phosphoryl chloride:

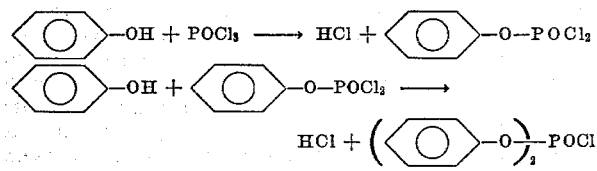

The phosphorus mono- and di-halidates produced are valuable intermediates in the preparation of plasticizers, oil additives and functional fluids and are prepared conveniently by the process of this invention in high yields with substantially no contamination by side reactants.

As stated hereinabove, the distillation residue which is utilized in the process of this invention contains liquid amide, phosphoramide, urea and ammonium salt compounds containing a nitrogen atom capable of forming a liquid complex with a phosphorus moiety. The distillation residue may contain such compounds per se and the complexes formed by such compounds during the reaction of the phosphorus halide with the thiol- or hydroxyl-containing material and the complexes formed during distillation. Illustrative amide, phosphoramide, urea and ammonium compounds which form liquid complexes and are useful as liquid catalysts in accordance with this invention are N - acetyl - p - chloroacetanilide, acetanilide, N,N-dimethylacetamide, N-methylacetanilide, acetamide, N-methylpyrrolidone, N,N' - dibutyloxamide, formamide, benzamide, biphenylacetamide, N-undecyloxalamide, N-hexyladipamide, acrylamide, stearolic acid amide, dimethylphosphorimide dichloride, N,N,N',N'-tetramethyl-p-phenylphosphonic diamide, phosphoric triamide, diethyl phenylphosphoroamidate, hexamethylphosphorous triamide, dimethylphosphoramidic dichloride, hexamethylphosphorothioic triamide, phosphorodiamidic acid, phosphorothioic triamide, phosphenic amide, bis(chloroethyl) phosphoramidate, ethyl - p - ethylphosphonamidate, dibenzyl phosphoramidic dichloride, dibutyl phenylphosphoramidate, naphthyl tetramethylphosphoramidate, diphenylphosphinic nitride, phenyl trimethylphosphonamidodithioate, diallylphosphoramidic dichloride, dibutenylphosphoramidothioate, cyclopentenylphosphoramidic dichloride, vinyl phenyl phenylphosphoramidobromidate, propynyl phosphorodiamidate, dibutyl phosphorochloridothioate, ammonium sulfate, ammonium chloride, ammonium nitrate, ammonium acetate, ammonium benzenesulfonate, ammonium carbonate, ammonium phosphate, ammonium cyanate, ammonium butyrate, ammonium acrylate, ammonium terephthalate, ammonium sulfite, ammonium formate, urea, tetramethylurea, diphenylurea, dipyrrolineurea, dodecylurea, tetramethylthiourea, dicyclohexylurea, propynylurea, hexylbiuret. A more extensive description of the catalyst compounds per se is disclosed in copending applications, Ser. Nos. 103,874; 103,831; 103,877 and 104,171, all abandoned.

At initiation of the reaction, the amount of catalyst employed, i.e., the amount of fresh catalyst as distinguished from the recycled distillation residue catalyst, is from about 0.005 to about 10.0 weight percent based on the phosphorus halide. Preferably, from 0.1 to 3.0 weight percent is considered a practical level. The distillation residue recycled from the distillation still is subsequently introduced into the reactor and contains an amount of from about 0.05 to 20 weight percent catalyst in the form of a liquid complex with the phosphorus halide and reaction products thereof.

The types of phosphorus halides utilized and prepared in accordance with this invention may be either starting materials or intermediates or end products of the process. For instance, a phosphoryl halide may be a starting material used to prepare a dihalidate phosphorus monoester such as a R' phosphorodihalidate. The R' phosphorodihalidate may be an intermediate in the preparation of, for example, a monohalidate phosphorous diester such as a di- R' phosphorohalidate. At the same time, however, the R' phosphorodihalidate and di-R' phosphorohalidate may be considered mono- and di-ester end products of the process of this invention. The phosphorus halides utilized are well known to those skilled in the art. Many are commercially available and all are easily prepared in accordance with the process of this invention. The compounds are encompassed by the scope of Formula I and include by way of illustration, compounds such as:

Phosphoryl halides:

Thiophosphoryl halides:

R' phosphorodihalidates:

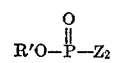

O-R' phosphorodihalidothioates:

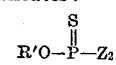

S-R' phosphorodihalidothioates:

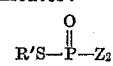

S-R' phosphorodihalidodithioates:

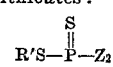

Di-R' phosphorohalidates:

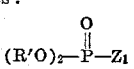

O,O-di-R' phosphorohalidothioates:

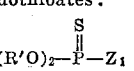

O,S-di-R' phosphorohalidothioates:

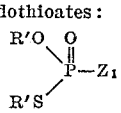

S,S-di-R' phosphorohalidodithioates:

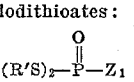

O,S-di-R' phosphorohalidodithioates:

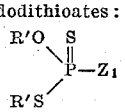

S,S-di-R' phosphorohalidotrithioates:

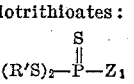

R-phosphonic dihalides:

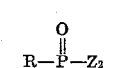

R-phosphonothioic dihalides:

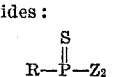

Di-D-phophinic halides:

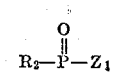

Di-R-phosphinothioic halides:

R′R-phosphonohalidates:

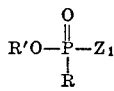

R′R-phosphonohalidothioates:

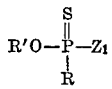

S-R′ R-phosphonohalidothioates:

S-R′ R-phosphonohalidodithioates:

In the above formulas, R, R′ and Z are defined as in Formula I.

As described in Formula I, R represents alkyl, e.g., methyl, ethyl, propyl, butyl, amyl, hexyl, heptyl, octyl, decyl, undecyl, dodecyl, pentadecyl, hexadecyl, octadecyl, nonadecyl and eicosyl, whether straight or branched chain in configuration; cycloalkyl, e.g., cyclopropyl, cyclobutyl, cyclopentyl, ethylcyclopropyl, cyclohexyl, methylcyclopentyl, methylcyclohexyl, decahydronaphthyl, bicyclohexyl (cyclohexylcyclohexyl), tetradecahydrophenanthryl, tricyclohexylmethyl; alkenyl, e.g., ethenyl, propenyl, butenyl, isobutenyl, pentenyl, methylbutenyl, trimethylethenyl, hexenyl, heptenyl, octenyl, nonenyl, decenyl, dodecenyl, tridecenyl, hexadecenyl, octadecenyl, eicosenyl; cycloalkenyl, e.g., cyclopropenyl, cyclopentenyl, cyclohexenyl, cyclohexyl-cyclohexenyl; alkynyl, e.g., ethynyl, propynyl, butynyl, pentynyl, hexynyl, heptynyl, octynyl, nonyoyl, decynyl, tridecynyl, octadecynyl, eicosynyl; cycloalkynyl, e.g., 1-cycloden-4-yl; heterocyclic radicals containing oxygen or sulfur in the heterocyclic ring, e.g., thiophenyl, furanyl, tetrahydrofuranyl, pyranyl, sulfolanyl; aryl, e.g., phenyl, naphthyl, biphenyl, phenanthryl, anthracyl, terphenyl or quaterphenyl; and R′ represents alkyl or aryl, as described above with reference to R.

R and R′ may be unsubstituted, as described above, or substituted. It is to be understood that the catalyst-containing distillation residues used in the process of this invention will catalyze the preparation of halogenated organophosphorus esters in accordance with this invention regardless of the type or extent of substitution of the radicals defined as included within R and R′ above. Thus the radicals represented by R and R′ may be substituted with any moiety except a carboxyl group or a hydroxyl group which interfere with the reaction.

The following radicals are illustrative of the substituents which may occur on the groups represented by R and R′ of the phosphorus halides: alkyl, cycloalkyl, alkenyl, cycloalkenyl, alkynyl, cycloalkynyl and aryl as described above. Also, halo, e.g., chloro, bromo, fluoro, iodo; alkoxy, e.g., methoxy, propoxy, butoxy, hexoxy, decoxy; cycloalkoxy, e.g., cyclohexoxy cyclobutoxy; alkenoxy, e.g., propenoxy, cycloalkenoxy, e.g., cyclopentenoxy; aryloxy, e.g., phenoxy, naphthoxy; cyano; nitro; isonitro; aldehyde; ketone; alkoxycarbonyl, e.g., methoxycarbonyl; aryloxycarbonyl, e.g., phenoxycarbonyl; alkylcarbonyloxy, e.g., acetyl; alkoxycarbonyloxy, e.g., acetoxy; arylcarbonyloxy, e.g., benzoyl; alkylthio, e.g., ethylthio; arylthio, e.g., phenylthio, naphthylthio; trihaloalkyl, e.g., trifluoromethyl; alkylsulfinyl, e.g., butylsulfinyl; arylsulfinyl, e.g., phenylsulfinyl; alkylsulfonyl, e.g., propylsulfonyl; arylsulfonyl, e.g., phenylsulfonyl.

Specific phosphorus halides which are encompassed within the scope of this invention, and which may be starting materials and/or desired products, include phosphoryl chloride, phosphoryl bromide, phosphoryl dibromide chloride, thiophosphoryl chloride and bromide, phenyl phosphorodichloridate, p-chlorophenyl phosphorodibromidate, p-nitrophenyl phosphorodichloridate, p-nitrophenyl phosphorodichloridothioate, cresyl phosphorodichloriate, o-methoxyphenyl phosphorodichloridate, nonylphenyl phosphorodichloridate, cumylphenyl phosphorodichloridate, o-biphenyl phosphorodichloridate, naphthyl phosphorodichloridate, isopropylphenyl phosphorodichloridate, tert-butylphenyl phosphorodichloridate, isodecyl phosphorodichloridate, S-phenyl phosphorodichloridothioate, S-p-nitrophenyl phosphorodichloridothioate, S-phenyl phosphorodichloridodithioate, diphenyl phosphorochloridate, dicresyl phosphorochloridate, O,O-diphenyl phosphorochloridothioate, S,S-diphenyl phosphorobromidodithioate, S,S - diphenyl phosphorochloridotrithioate, phenylphosphonic dichloride, p - chlorophenylphosphonic dibromide, butyl phosphorodichloridate, hexyl phosphorodichloridate, octyl phosphorodichloridate, decyl phosphorodichloridate, methylphosphonic dichloride, chloromethylphosphonic dichloride, phenylphosphonothioic dichloride, cresylphosphonothioic dibromide, methylphosphonothioic dichloride, chloromethylphosphonothioic dichloride, phenyl phenylphosphonochloridate, p - nitrophenyl phenylphosphonochloridate, cresyl phenylphosphonochloridate, O-phenyl phenylphosphonochloridothioate, S-phenyl phenylphosphonobromidothioate, S-phenyl phenylphosphonochloridodithioate.

The alcohols and thioalcohols embraced by the scope of Formula II include those compounds wherein R″ represents aryl groups as defined with respect to R and R′ of the phosphorus halides. Thus, R″ represents phenyl, alkylphenyl, halophenyl, arylphenyl, cycloalkylphenyl, naphthyl, biphenyl, phenanthryl, anthracyl, terphenyl, quaterphenyl, whether substituted or non-substituted.

Specific alcohols of the formula R″XH which will illustrate the types of compounds utilized include phenol, o, m, p-cresol, o-ethylphenol, o, m, p-isopropylphenol, p-tert-butylphenol, p-tert-amylphenol, nonylphenol, 2,4-xylenol, 2,6-xylenol, 2,5-xylenol, 2,3-xylenol, o, m, p-chlorophenol, p-bromophenol, p-iodophenol, 2,4-dichlorophenol, 2,4,5-trichlorophenol, pentachlorophenol, o-phenylphenol, p-cumylphenol, o-cyclohexylphenol, alpha-naphthol, beta-naphthol, o-methoxyphenol, p-ethoxyphenol, o-phenoxyphenol, p-nitrophenol, p-trifluoromethylphenol, 2-allylphenol, 2-benzylphenol, vanillin, 4-chloro-3,5-dimethylphenol, 4-chloro-1-naphtho, 2-choro-4-nitrophenol, 4-cyanophenol, 2,4-di-tert-butylphenol, 2,4-dimethoxyphenol, methylsalicylate, 2-fluorophenol, p-hydroxyacetophenone, 4-hydroxybenzaldehyde, thiophenol, p-chlorothiophenol, p-tert-butylthiophenol, thiocresol, thioxylenol, phenylthiophenol, thionaphthol, allylthiophenol.

The compounds of Formulas I and II, described above, are generally known in the art and their methods of preparation are available in standard texts and reference sources.

A preferred class of the compounds of Formula I are those compounds of the formula

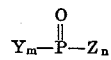

wherein Y=R or R′O wherein R′=aryl or substituted aryl and R, Z, m and n are defined in Formula I. Representative of this preferred class of compounds are phosphoryl chloride, phosphoryl bromide, phenyl phosphorodichloridate, p-chlorophenyl phosphorodibromidate, butyl phosphorodichloridate, hexyl phosphorodichloridate, octyl phosphorodichloridate, decyl phosphorodichloridate, p-nitrophenyl phosphorodichloridate, cresyl phosphorodichloridate, o-methoxyphenylphosphorodichloridate, nonylphenyl phosphorodichloridate, cumylphenyl phosphorodichloridate, o-biphenyl phosphorodichloridate, naphthyl phosphorodichloridate, isopropylphenyl phosphorodichloridate, tert-butylphenyl phosphorodichloridate, diphenyl phosphorochloridate, dicresyl phosphorochloridate, phenylphosphonic dichloride, p-chlorophenylphosphonic dichloride, methylphosphonic dibromide, chloromethylphosphonic dichloride, phenyl phenylphosphonochloridate, p-nitrophenyl phenylphosphonochloridate, cresyl phenylphosphonochloridate.

A preferred class of the compounds of Formula II are those compounds of the formula R″OH. Representative of this preferred class of compounds are phenol, o, m, p-cresol, o-ethylphenol, o, m, p-isopropylphenol, p-tert-butylphenol, p-tert-amylphenol, nonylphenol, xylenol, o, m, p-chorophenol, p-bromophenol, p-iodophenol, dichlorophenol, trichlorophenol, pentachlorophenol, p-cumylphenol, o-cyclohexylphenol, naphthol, methoxyphenol, ethoxyphenol, phenoxyphenol, p-nitrophenol, trifluoromethylphenol, allylphenol, benzylphenol, vanillin, 4-choro-3,5-dimethylphenol, 4-chloro-1-naphtho, 2-chloro-4-nitrophenol, cyanophenol, di-tert-butylphenol, dimethoxyphenol, methylsalicylate, fluorophenol. Especially preferred of this group are phenol, cresol, cumylphenol, nonylphenol, chlorophenol, tert-butylphenol, xylenol, phenylphenol, isopropylphenol and mixtures thereof.

A specialized class of alcohols which are utilized in accordance with this invention are alcohols of the formula (III)         HO—R‴—OH wherein R‴ represents isopropylidenediphenylene, e.g.,

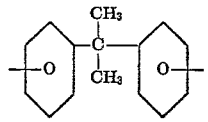

or phenylene, e.g.

Representative of this special class of alcohols are isopropylidenediphenol, hydroquinone, catechol and resorcinol.

In accordance with the novel process of this invention, the reaction between the phosphorus halides and alcohols to prepare organophosphorus esters proceeds in two stages. Use of the aforedescribed distillation still residues in conjunction with specific temperatures, produces the desired results of this invention. Thus, in accordance with the process of this invention, the first chlorine of, for example, phosphoryl chloride is replaced at a temperature of from about 85 to 135° C., preferably 105° C. The second chlorine, i.e., disubstitution, is replaced at a temperature of from about 130 to about 165° C., preferably 150° C. Of course, the specific temperatures for mono- and disubstitution will vary with the particular reactants being used, but the comparative differences in the temperatures for the stages of substitution will remain approximately the same.

Accordingly, the combination of specific temperatures for mono- and di-substitution of the desired phosphorus halides, together with the catalytically active distillation residue used in the process of this invention, enable those skilled in the art to prepare halogenated mono- or di-organophosphorus esters in selected proportions. Di-organophosphorus esters may be prepared in two stages, with a different alcohol being added at each stage. Similarly, mixtures of esters may be prepared in one reactor. For example, by adding a naphthyl group at the first stage and a chlorophenyl group at the second stage, one may use the same phosphorus halide but merely introduce different appropriate alcohol at the temperature stages set forth to obtain naphthyl chlorophenyl phosphorochloridate and naphthyl phosphorodichloridate. The different compounds may then be recovered separately by methods known in the art. Further, selected proportions of various compounds may be prepared in the same reactor. Thus, if one desires a mixture of phenyl phosphorodichloridate and naphthyl phenyl phosphorochloridate in proportions of 2:1, such selective proportions of the desired products can be made in accordance with the present invention by adding the intended proportion of each appropriate alcohol in the separate stages.

The following examples will serve to illustrate specific embodiments of the concept of this invention but are not to be regarded as restrictive of the scope thereof since it has been found that the process of this invention promotes the reaction between virtually any phosphorus halide and any alcohol as defined herein.

Example 1

To a mixture of 225 g. phosphoryl chloride and 2 g. N-methylpyrrolidone there is added 94 g. phenol over a two hour period at a temperature at 105° C. The temperature is then raised to 110° C. and held for an additional hour. The reaction mixture is stripped of volatiles and a first cut is distilled at 70° C. (pot) and 0.25 mm. Hg. A second cut is distilled at 72° C. (pot) and 3 mm. Hg. The total distilled material consisted of 174.5 g. of product (82 percent of theoretical) of which 90 percent is phenylphosphorodichloridate and 7 percent is diphenyl phosphorochloridate.

The distillation residue, 20 g., contains a catalyst complex concentration of 10 percent, based on N-methylpyrrolidone, and is held for use as the catalyst for the esterification of Example 2.

Example 2

To a mixture of 225 g. phosphoryl chloride and the distillation residue of Example 1 there is added 94 g. phenol. The reaction mixture is heated to 110° C. and allowed to cool gradually to room temperature. Volatiles are stripped from the mixture and the remaining liquid is subjected to distillation at 70–75° C. at 0.3 mm. There is collected 150 g. product (71 percent of theoretical) consisting of 0.3 percent diphenyl phosphorochloridate and 95.7 percent phenyl phosphorodichloridate. The residue amounts to 61.5 g. which contains 6.9 percent phenyl phosphorodichloridate, 87.9 percent diphenyl phosphorochloridate and 4.0 percent catalyst complex.

Example 3

To a mixture of 225 g. phosphoryl chloride and 2 g. N-methylpyrrolidone there is added 94 g. phenol over a two hour period at 105° C. The temperature is held at 105–110° C. for an additional hour and one-half and stripped of volatiles.

The reaction mixture is distilled at 65–66° C. (pot) and 0.2 mm. yielding 194 g. product (92 percent of theoretical) mainly consisting of phenyl phosphorodichloridate and 20 g. still residue. The still residue contains a catalyst complex concentration of 10 percent, based on N-methylpyrrolidone, and is held for use in Example 4.

Example 4

An amount of 225 g. phosphoryl chloride and the still residue of Example 3 are combined and heated to 107° C. To the mixture are added 94 g. phenol over a two hour period at 105–108° C. The temperature is held at 107–110° C. for two hours, cooled and stripped of volatiles.

The reaction mixture is distilled at 72° C. and 0.25 mm. yielding 185 g. product (87 percent of theoretical) consisting of 183 g. phenyl phosphorodichloridate and 2 g. diphenyl phosphorochloridate. Residue amounts to 44 g.

Example 5

An amount of 450 g. phosphoryl chloride, 2 g. N-methylpyrrolidone and 40 g. of the still residue of Example 4 are combined and heated to 105° C. Over a two hour period, 188 g. phenol are added at 105–108° C. The temperature is then held at 107–110° C. for two additional hours, cooled and stripped of volatiles.

The reaction mixture is distilled in ten cuts at conditions ranging from 87° C. and 0.9 mm. to 110° C. and 0.68 mm. to 130° C. and 0.78 mm. A total of 379 g. product is removed (90 percent of theoretical), consisting of 259 g. phenyl phosphorodichloridate and 20 g. diphenyl phosphorochloridate. Residue amounts to 64 g.

In accordance with the procedures of Examples 1–5, additional esterifications are performed as indicated in the following table. The table heading "Catalyst" indicates still residues containing the defined catalyst in the form of a complex with a phosphorus halide.

TABLE

| Example | Phosphorus halide | Alcohol | Catalyst |
| --- | --- | --- | --- |
| 6 | Phosphoryl chloride | Phenol | Ammonium sulfate. |
| 7 | Phosphoryl dibromide chloride | Cresol | Ammonium chloride. |
| 8 | Phosphoryl bromide | Cumylphenol | Ammonium nitrate. |
| 9 | Phenyl phosphorodichloridate | Nonylphenol | Ammonium acetate. |
| 10 | Methoxyphenyl phosphorodichloridate | Chlorophenol | Ammonium benzenesulfonate. |
| 11 | Phenylphosphonic dichloride | Tert-butylphenol | Ammonium carbonate. |
| 12 | Chloromethylphosphonic dichloride | Xylenol | Ammonium phosphate. |
| 13 | Phenylphosphonothioic dichloride | Phenylphenol | Ammonium cyanate. |
| 14 | Diethylphosphinothioic dichloride | Isopropylphenol | Ammonium butyrate. |
| 15 | Cresyl phosphorodichloridate | Cumylphenol/nonylphenol | Ammonium caproate. |
| 16 | Nonylphenol phosphorodichloridate | Cyclohexylphenol | Benzamide. |
| 17 | Cumylphenyl phosphorodibromidate | α-Naphthol | N-acetyl-p-chloroacetanilide. |
| 18 | Naphthyl phosphorodichloridate | p-Nitrophenol | Acetanilide. |
| 19 | Phenylphosphonic dichloride | 2-allylphenol | N,N-dimethylacetamide. |
| 20 | Phosphoryl chloride | 2-benzylphenol | N-methylacetanilide. |
| 21 | Thiophosphoryl bromide | Vanillin | Acetamide. |
| 22 | Cumyl phosphorodichloridate | p-Hydroxyacetophenone | N-methylpyrrolidone. |
| 23 | Phenyl phosphorodichloridate | Thiocresol | 2-pyrrolidone. |
| 24 | Phosphoryl bromide | Phenylthiophenol | N,N'-dibutyloxamide. |
| 25 | Thiophosphoryl chloride | Ethylphenol | N,N-dimethylaniline. |
| 26 | Phosphorus oxydibromide chloride | 2-ethylhexylphenol | 1-methylimidazole. |
| 27 | Chlorophenyl phosphorodibromidate | Phenylphenol | Pyridine. |
| 28 | Nitrophenyl phosphorodichloridate | Xylenol | Isoquinoline. |
| 29 | Cresyl phosphorodichloridate | Phenol | 2,6-lutidine. |
| 30 | Methoxyphenyl phosphorodichloridate | Hydroquinone | Quinaldine. |
| 31 | Nonylphenyl phosphorodichloridate | Catechol | Urea. |
| 32 | Biphenyl phosphorodichloridate | Cumylphenol | 1,3-diphenylurea. |
| 33 | Naphthyl phosphorodichloridate | tert-Amylphenol | Dipyrrolineurea. |
| 34 | Isodecyl phosphorodichloridate | Pentachlorophenol | Tetramethylurea. |
| 35 | Phenylphosphonic dichloride | Phenoxyphenol | Hexamethylphosphoric triamide. |
| 36 | Methylphosphonic dichloride | Bromophenol | Phenyl N,N'-dimethyl-N,N'-dibutyl phosphorodiamidate. |
| 37 | Phosphoryl bromide | α-Naphthol | Dimethylphosphorodiamidic chloride. |
| 38 | Isopropylphenylphosphorodichloridate | Flurorphenol | Acetanilide. |
| 39 | Methylphosphonic dibromide | Nitrophenol | Phosphoric triamide. |
| 40 | Phosphoryl chloride | Nonylphenol | Urea. |
| 41 | Phenyl phosphorodibromidate | Phenol | Tetramethylurea. |
| 42 | Cresyl phosphorodibromidate | Benzylphenol | Tetramethylthiourea. |
| 43 | Thiophosphoryl bromide | Thiocresol | Hexamethylphosphorus triamide. |
| 44 | Methylphosphonic dichloride | Xylenol | Ammonium sulfate. |
| 45 | Phosphoryl dichloride bromide | Vanillin | Ammonium acetate. |
| 46 | Cresyl phosphorodichloridate | Hydroxyacetophenone | Ammonium acrylate. |
| 47 | Nonyl phosphorodibromidate | Cyclohexylphenol | Ammonium nitrate. |
| 48 | Thiophosphoryl chloride | Phenol | Ammonium formate. |

Example 49

To a mixture of 920 g. phosphoryl chloride and 8 g. dimethylacetamide there is added a mixture of 614 g. cumylphenol and 794 g. nonylphenol during two hours at 105–110° C. The temperature is then raised to 135° C. and 565 g. phenol are added over two hours. The temperature is then raised and held at 150° C. for one and one-half hours, cooled and stripped of volatiles.

The reaction mixture is distilled affording 2197 g. of product consisting of a mixture of cumylphenyl phenyl phosphorochloridate and nonylphenyl phenyl phosphorochloridate. A residue of 255 g. remains.

Example 50

A mixture of 225 g. phosphoryl chloride and 40 g. of Example 49 still residue is heated to 105° C. and 109 g. cresol are added over two hours at 105–107° C. The temperature is held at 105–110° C. for two hours and stripped of low boilers.

The temperature of the reaction mixture is raised to 135° C. and 94 g. phenol are added during two hours at 150° C. The temperature is maintained for two hours. The reaction mixture is cooled and stripped of volatiles. Distillation affords 252 g. cresyl phenyl phosphorochloridate (90 percent of theoretical based on phenols charged).

The embodiments of the invention in which an exclusive property or privilege is claimed are as follows:

1. The process of preparing organophosphorus esters which comprises reacting a phosphorus halide and an aryl alcohol or thioalcohol in the presence of a distillation residue produced by distilling (a) the product derived from a reaction mixture of a thio- or hydroxyl-containing aryl organic material, a phosphorus halide and a catalyst material selected from amide, phosphorus amide, urea and ammonium salt compounds containing a nitrogen atom capable of forming a complex with a phosphorus moiety or (b) the product derived from such reaction mixture in which said distillation residue is employed as the catalyst material at a temperature of up to about 165° C.

2. The process of preparing organophosphorus esters which comprises reacting a phosphorus halide of the formula

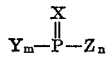

wherein:

X represents oxygen or sulfur;
Y represents R or R'X;
R represents alkyl, alkenyl, alkynyl, cycloalkyl, cycloalkenyl, cycloalkynyl, heterocyclyl or aryl;
R' represents alkyl or aryl;
$m$ represents 1 when $n=2$ and 2 when $n=1$;
$n$ represents 1 or 2; and
Z represents chloro or bromo with a compound of the formula

wherein

R" represents aryl; and
X represents oxygen or sulfur at a temperature of up to about 165° C. in the presence of a distillation residue produced by distilling (a) the product derived from a reaction mixture of a thiol- or hydroxyl-containing aryl organic material, a phosphorus halide and a catalyst material selected from amide, phosphorus amide, urea and ammonium salt compounds containing a nitrogen atom capable of forming a complex with a phosphorus moiety or (b) the product derived from such reaction mixture in which said distillation residue is employed as the catalyst material at a temperature of up to about 165° C.

3. The process of claim 2 wherein R" is selected from the group consisting of phenyl, cresyl, cumylphenyl, nonylphenyl, xylyl, tert-butylphenyl, phenylyl, isopropylphenyl, chlorophenyl and mixtures thereof.

4. A process for preparing an organophosphorodihalidate which comprises reacting a phosphorus halide according to claim 2 with an approximately equimolar amount of a compound of the formula R"XH according to claim 2 at a temperature of about 135° C. in the presence of a catalytic amount of a distillation residue produced by distilling (a) the product derived from a reaction mixture of a thio- or hydroxyl-containing aryl organic material, a phosphorus halide and a catalyst material selected from amide, phosphorus amide, urea and ammonium salt compounds containing a nitrogen atom capable of forming a complex with a phosphorus moiety or (b) the product derived from such reaction mixture in which said distillation residue is employed as the catalyst material at a temperature of up to about 165° C.

5. The process of claim 4 wherein R" is selected from phenyl, cresyl, cumylphenyl, nonylphenyl, xylyl, tert-butylphenyl, phenylyl, isopropylphenyl, chlorophenyl and mixtures thereof.

6. The process of claim 4 wherein said organophosphorusdihalidate is selected from phenyl phosphorodichloridate, phenylyl phosphorodichloridate, cresyl phosphorodichloridate, tert-butylphenyl phosphorodichloridate, cumylphenyl phosphorodichloridate, nonylphenyl phosphorodichloridate, xylyl phosphorodichloridate, isopropylphenyl phosphorodichloridate, chlorophenyl phosphorodichloridate and mixtures thereof.

7. A process for preparing a diorganophosphorushalidate which comprises reacting an organophosphorusdihalidate with an approximately equimolar amount of a compound of the formula R"XH according to claim 2 at a temperature of about 165° C. in the presence of a catalytic amount of a distillation residue produced by distilling (a) the product derived from a reaction mixture of a thio- or hydroxyl-containing aryl organic material, a phosphorus halide and a catalyst material selected from amied, phosphorus amide, urea and ammonium salt compounds containing a nitrogen atom capable of forming a complex with a phosphorus moiety or (b) the product derived from such reaction mixture in which said distillation residue is employed as the catalyst material at a temperature of up to about 165° C.

8. The process of claim 7 wherein said diorganophosphorohalidate is selected from nonylphenyl phenyl phosphorochloridate and cumylphenyl phenyl phosphorochloridate and mixtures thereof.

9. A process for preparing organophosphorus esters which comprises reacting, in the presence of a catalytic amount of a distillation residue produced by distilling (a) the product derived from a reaction mixture of a thiol- or hydroxyl-containing aryl organic material, a phosphorus halide and a catalyst material selected from amide, phosphorus amide, urea and ammonium salt compounds containing a nitrogen atom capable of forming a complex with a phosphorus moiety or (b) the product derived from such reaction mixture in which said distillation residue is employed as the catalyst material at a temperature of up to about 165° C., (1) a phosphorus halide of claim 2 with an approximately equimolar amount of a first compound of formula R"XH of claim 2 at a temperature of about 85–135° C. to form an organophosphorusdihalidate, (2) adding an approximately equimolar amount of a second compound of formula R"XH to the reaction product of (1) at a temperature of about 130–165° C. to form a diorganophosphorushalidate.

10. The process of claim 9 wherein said compound of formula R"XH is selected from the group consisting of phenol, cresol, cumylphenol, nonylphenyl, xylenol, tert-butylphenol, phenylphenol, isopropylphenol, chlorophenol and mixtures thereof.

11. The process of preparing organophosphorus esters which comprises reacting a phosphorus halide of the formula

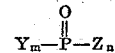

wherein:

Y represents R or R'O;
R represents alkyl, alkenyl, alkynyl, cycloalkyl, cycloalkenyl, cycloalknyl, heterocyclyl or aryl;
R' represents aryl;
$m$ represents 1 when $n=2$ and 2 when $n=1$;
$n$ represents 1 or 2; and
Z represents chloro or bromo with an approximately $n$ molar amount of a compound of the formula wherein:

R" represents aryl; and
X represents oxygen or sulfur at a temperature of up to about 165° C. in the presence of a catalytic amount of a distillation residue produced by distilling (a) the product derived from a reaction mixture of a thio- or hydroxyl-containing aryl organic material, a phosphorus halide and a catalyst material selected from amide, phosphorus amide, urea and ammonium salt compounds containing a nitrogen atom capable of forming a complex with a phosphorus moiety or (b) the product derived from such reaction mixture in which said distillation residue is employed as the catalyst material at a temperature of up to about 165° C.

12. The process of preparing organophosphorus esters according to claim 1 which comprises reacting a phosphorus halide of the formula

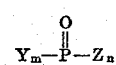

wherein:

Y represents R or R'O;
R represents alkyl, alkenyl, alkynyl, cycloalkyl, cycloalkenyl, cycloalkynyl, heterocyclyl or aryl;
R' represents aryl;
$m$ represents 1 when $n=2$ and 2 when $n=1$;
$n$ represents 1 or 2; and
Z represents chloro or bromo with an approximately $n$ molar amount of a compound of the formula

wherein R" represents aryl at a temperature of up to 165° C. in the presence of a catalytic amount of a distillation residue produced by distilling (a) the product derived from a reaction mixture of a thiol- on hydroxy-containing acyl organic material, a phosphorus halide and a catalyst material selected from amide, phosphorus amide, urea and ammonium salt compounds containing a nitrogen atom capable of forming a complex with a phosphorus moiety or (b) the product derived from such reaction mixture in which said distillation residue is employed as the catalyst material at a temperature of up to about 165° C.

13. The process of claim 12 wherein R " is selected from the group consisting of phenyl, cresyl, cumylphenyl, nonylphenyl, xylyl, tert-butylphenyl, phenyl, isopropylphenyl, chlorophenyl and mixtures thereof.

14. The process of claim 12 wherein said catalyst material is selected from acetamide, acetanilied, N-methylacetanilide, N-acetyl-p-chloroacetanilide, phthalamide, polyacrylamide, adipamide, N,N-dibutyloxamide, 1-methylpyrrolidone, 2-pyrrolidone, hexamethylphosphoric triamide, phenyl N,N'-dimethyl-N,N'dibutyl phosphoroamidate, dimethylphosphoramidic dichloride, N,N,N',N'-tetramethyl-P-phenylphosphonic diamide, phosphoric, triamide, P,P-diphenylphosphinic amide, O,O-diethyl dimethylphosphoramidothioate, diethyl phenylphosphoroamidate, diphenyl phosphorochloridate, diethyl phosphoramidate, urea, tetramethylurea, diphenylurea, dodecylurea, dipyrrolineurea, ammonium sulfate, ammonium chloride, ammonium nitrate, ammonium acetate, ammonium benzene sulfonate, ammonium phosphate, ammonium oxalate and ammonium carbonate.

15. The process of preparing organophosphorus esters which comprises reacting a phosphorus halide of the formula

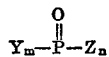

wherein:

Y represents R or R'O;

R represents alkyl, alkenyl, alkynyl, cycloalkyl, cycloalkenyl, cycloalkynyl, heterocyclyl or aryl;

R' represents aryl;

$m$ represents 1 when $n=2$ and 2 when $n=1$;

$n$ represents 1 or 2; and

Z represents chloro or bromo with an approximately $n$ molar amount of a compound of the formula

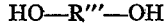

wherein R''' represents isopropylidenediphenylene or phenylene at a temperature of up to about 165° C. in the presence of a distillation residue produced by distilling (a) the product derived from a reaction mixture of a thiol- or hydroxyl-containing aryl organic material, a phosphorus halide and a catalyst material selected from amide, phosphorus amide, urea and ammonium salt compounds containing a nitrogen atom, capable of forming a complex with a phosphorus moiety or (b) the product derived from such reaction mixture in which said distillation residue is employed as the catalyst material at a temperature of up to about 165° C.

16. The process of preparing an organophosphorus ester according to claim 12 which comprises reacting phosphoryl chloride with an approximately dimolar amount of phenol at a temperature of up to about 165° C. in the presence of a distillation residue produced by distilling (a) the product derived from a reaction mixture of a phenol or thiophenol, a phosphorus halide and a catalyst material selected from amide, phosphorus amide, urea and ammonium salt compounds containing a nitrogen atom capable of forming a complex with a phosphorus moiety or (b) the product derived from such reaction mixture in which said distillation residue is employed as the catalyst material at a temperature of up to about 165° C.

17. The process of claim 12 wherein said organophosphorus ester is selected from diphenyl phosphorochloridate, dicresyl phosphorochloridate, cumylphenyl phenyl phosphorochloride, cresyl phenyl phosphorochloridate, nonylphenl phenyl phosphorochloridate and mixtures thereof.

References Cited
UNITED STATES PATENTS 3,077,491  2/1963  Seglin et al. _____ 260—975

ANTON H. SUTTO, Primary Examiner

U.S. Cl. X.R.

260—327 R, 345.1, 346.1 R, 347.2, 930, 956, 958, 961, 964

PO-1050
(5/69)

UNITED STATES PATENT OFFICE
CERTIFICATE OF CORRECTION

Patent No. 3,790,649  Dated February 5, 1974

Inventor(s) Ignatius Schumacher and Joseph W. Baker

It is certified that error appears in the above-identified patent and that said Letters Patent are hereby corrected as shown below:

Column 4, line 72, the formula "Di-D-phophinic halides" should be corrected to read "Di-R-phosphinic halides".

Column 9, line 11, "removered" should be corrected to read "recovered".

Column 12, line 24, after "formula" the following formula should be added --- R"XH ---.

Column 12, line 3 of Claim 13, after "tert-butylphenyl" phenyl should be corrected to "phenylyl".

Signed and sealed this 16th day of July 1974.

(SEAL)
Attest:

McCOY M. GIBSON, JR.
Attesting Officer

C. MARSHALL DANN
Commissioner of Patents